Patented Feb. 17, 1925.

1,526,780

UNITED STATES PATENT OFFICE.

CHARLES E. FENLON, OF EAST TROY, WISCONSIN, ASSIGNOR TO TROY MILK PRODUCTS COMPANY, OF EAST TROY, WISCONSIN, A CORPORATION OF MAINE.

PROCESS FOR CANNING CREAM.

No Drawing.     Application filed June 20, 1921. Serial No. 479,094.

*To all whom it may concern:*

Be it known that I, CHARLES E. FENLON, a citizen of the United States, and a resident of East Troy, in the county of Walworth, State of Wisconsin, have invented certain new and useful Improvements in a Process for Canning Cream; and I do hereby declare that the following is a full, clear, and exact description thereof.

This invention relates to improvements in a process for canning cream and to the canned product, and consists of the matters hereinafter described and more particularly pointed out in the appended claim.

The present improvements are adapted for use in connection with the process and product described in an application heretofore filed by me on the 18th day of November, 1918, Serial No. 263,069, and their object is to still further improve the character and flavor and the keeping or lasting quality of the canned cream resulting from the process.

An important step in a process of the kind is one performed to standardize or reduce the fresh cream to a certain solid content, and this step, as described in the above mentioned application, was carried out by evaporating the cream, thereby reducing the water content and raising the percentage of solid content of the cream. This necessitated heating the whole body of cream in a vacuum pan, which has a tendency to slightly flavor the cream.

In order to overcome this difficulty, I standardize the cream to bring it to contain the desired percentage of solid content, not by reducing the water content but by adding solids, not butter fat, in the form of a milk product containing a large percentage of solids not fat, such as condensed skim or whole milk or skim or whole milk powder.

I have found that the best results are produced by bringing the cream to a point where it contains from 7 to 10 per cent by weight of solids not fat, whatever may be the percentage of butter fat, as 18% butter fat or 24% butter fat or any butter fat content between the two. Said two percentages of butter fat are mentioned merely as representing two standards of butter fat content for cream, the first being a low grade cream and the second being a high grade cream.

In standardizing the fresh cream by the addition of condensed milk or milk powder, the flavor of the fresh cream is retained with little or no change, since any slight flavor that the condensed milk or milk powder may have acquired by reason of its treatment in the vacuum pan or in the drying process is substantially lost when added to and mixed with the large body of cream, because of the small proportion the added milk product bears to the total quantity of fresh cream.

To illustrate by a specific example, take cream containing 18% of butter fat. The fresh, raw cream is placed in glass lined tanks or vats, care being had that the cream shall touch nothing which will affect or change its flavor of fresh cream. Such cream, as it comes from the separator, contains 5 to 6% of solids, not fat, in addition to the 18% of butter fat. The exact percentage of solids, not fat, is carefully determined. Suppose the cream contains 5% of solids not fat. An amount of concentrated or condensed skim or whole milk or of whole or skim milk powder is then added to the batch of fresh cream to furnish from 2 to 5% additional solids not fat to the mixture, the required amount of condensed milk or milk powder for the purpose being capable of ready calculation. By condensed milk is meant milk which has been reduced approximately 4 to 1, in the case of skim milk, and approximately 2½ or 3 to 1, in the case of whole milk. The mixture is then agitated by stirring or in any other familiar manner to thoroughly and uniformly mix the condensed milk or dissolve the milk powder. The batch of cream then contains substantially 18% butter fat (there being a small additional percentage of cream due to that contained in the added condensed milk or milk powder in case of whole milk products) and from 7 to 10% of solids not butter fat.

The same procedure is had in the case of cream containing a higher percentage of butter fat, as say 24% butter fat,—the cream batch in the end being brought to a solid content of substantially 24% butter fat and from 7 to 10% of solids not butter fat.

After the cream has been standardized as above described, it is heated to a temperature of from 140° to 170° to pasteurize it, the temperature depending upon the condition of the cream and the time of the year, care being had that it does not curdle, which may occur if the cream is tender and if it be heated too hot.

The cream is then, and while hot, put through a homogenizer, as before. In homogenizing the cream, however, it is not only subjected to high pressure (from 1000 to 2000 lbs.) but it is put through the homogenizer two or more times. Samples of the cream, after it has passed through the homogenizer, are examined from time to time under the microscope and the homogenizing process is continued until such examination shows that the fat globules have been broken up into uniform, minute particles. Cream with the greater percentage of butter fat content requires a higher pressure in the homogenizer than cream of a less percentage of butter fat content.

After the cream is completely and thoroughly homogenized, it is placed in cans, which are hermetically sealed. The cans are then placed in a sterilizing apparatus, including a revolving cradle to contain the cans, and are subjected to a temperature of from 179° to 250° F. The temperature must in no case be high enough to scorch the cream or to impart to it a cooked flavor. The temperature and the time required for sterilization are determined in the case of each batch of cream in process of canning by test of a sample.

The sterilization must be continued until the bacteria are completely destroyed, the period of time varying according to the nature and quality of the cream under treatment. The time may be determined by a test run with the sample in a Mojonnier viscosity tester or viscosimeter. (Said tester includes a ball suspended on a long wire with which is associated a graduated circular scale adapted to indicate the comparative angles of rotation of the ball in the cream as the viscosity varies.) Sterilization is continued until the viscosity tester registers 150° to 250° and the time required is noted.

The closed cans containing the cream are then sterilized under the same conditions for the length of time thus predetermined. After sterilization the cans are cooled to the temperature of the atmosphere. This completes the process—the canned cream being then ready for storage or shipment.

The canned cream thus produced is practically fresh cream and has substantially the flavor of fresh cream. The butter fat remains uniformly distributed in suspension throughout the body of cream in the can. The cream continues in its liquid form and otherwise retains all the characteristics of fresh cream. It may even be whipped.

Having thus described my invention, I claim the following:

The process of canning fresh cream which consists in taking fresh cream and treating it to standardize it by adding a small proportion of a milk product containing a large percentage of solids not fat to raise the solid content of the cream to 7 to 10% of solids not fat; then subjecting the resulting product to the action of a homogenizer under high pressure, continuing the treatment in the homogenizer until the butter fat content has been reduced to finely and uniformly divided particles as may appear when examined under a microscope; then placing the cream in hermetically sealed cans and sterilizing it until the cream has been brought to a predetermined viscosity; and then cooling the canned product.

In testimony that I claim the foregoing as my invention, I affix my signature in the presence of two witnesses, this 3rd day of June, A. D. 1921.

CHARLES E. FENLON.

Witnesses:
CLARENCE E. MEHLHOPE,
T. H. ALFREDS.